(12) United States Patent
Raghavan et al.

(10) Patent No.: US 12,040,875 B2
(45) Date of Patent: Jul. 16, 2024

(54) BEAM SWITCHING DIVERSITY ACROSS SLOTS

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/656,492

(22) Filed: Mar. 25, 2022

(65) Prior Publication Data

US 2023/0308164 A1 Sep. 28, 2023

(51) Int. Cl.
*H04B 7/08* (2006.01)
*H04W 72/044* (2023.01)

(52) U.S. Cl.
CPC ........... *H04B 7/088* (2013.01); *H04B 7/0857* (2013.01); *H04W 72/044* (2013.01)

(58) Field of Classification Search
CPC .... H04B 7/0857; H04B 7/088; H04W 72/044
USPC ........................................................ 375/373
See application file for complete search history.

(56) References Cited

U.S. PATENT DOCUMENTS

2017/0251460 A1* 8/2017 Agiwal ................ H04B 7/0617
2019/0053227 A1* 2/2019 Huang ............. H04L 25/03006
2019/0335441 A1* 10/2019 Bai ........................ H04L 5/0053
2019/0335477 A1* 10/2019 Nam ...................... H04L 5/0048
2020/0106588 A1* 4/2020 Gulati .................... H04L 5/0062
2021/0037528 A1* 2/2021 Nam ...................... H04L 1/0008
2021/0058111 A1* 2/2021 Liu ........................ H04L 5/0012

FOREIGN PATENT DOCUMENTS

KR          20190039223    *  4/2019
WO    WO-2019024781 A1  *  2/2019  ............ H04W 24/08
WO         2020231834 A1    11/2020

OTHER PUBLICATIONS

International Search Report and Written Opinion—PCT/US2023/063012—ISA/EPO—May 15, 2023.
Qualcomm: "Beam Management for NR", 3GPP TSG-RAN WG1 Meeting #92, R1-1802823, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018, XP051398236, 5 pages, p. 3.

* cited by examiner

*Primary Examiner* — Leila Malek
(74) *Attorney, Agent, or Firm* — Kevin M. Donnelly; Harrity & Harrity, LLP

(57) ABSTRACT

Various aspects of the present disclosure generally relate to wireless communication. In some aspects, a network node may receive an indication of a beam switching mode for reception of a communication spanning multiple slots. The network node may receive the communication in a first group of symbols of the multiple slots using a first beam in accordance with the beam switching mode. The network node may receive the communication in a second group of symbols of the multiple slots using a second beam in accordance with the beam switching mode. Numerous other aspects are provided.

28 Claims, 9 Drawing Sheets

BEAM SWITCHING DIVERSITY ACROSS SLOTS

FIELD OF THE DISCLOSURE

Aspects of the present disclosure generally relate to wireless communication and specifically, to techniques and apparatuses for beam switching diversity across slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Devices may use beamforming to improve gain of communications between the devices, particularly in higher frequency ranges like millimeter wave. For example, a user equipment and a network entity may communicate using a beam pair, which includes a beam at the user equipment and a beam at the network entity. Traditionally, this beam pair steers energy along a path corresponding to a best cluster (described elsewhere herein) and is configured using beam management signaling. However, in some contexts, using a single beam pair over the entirety of a communication may lead to suboptimal performance of the communication.

SUMMARY

Some aspects described herein relate to a method of wireless communication performed by a network node. The method may include receiving an indication of a beam switching mode for reception of a communication spanning multiple slots. The method may include receiving the communication in a first group of symbols of the multiple slots using a first beam in accordance with the beam switching mode. The method may include receiving the communication in a second group of symbols of the multiple slots using a second beam in accordance with the beam switching mode.

Some aspects described herein relate to a method of wireless communication performed by a network entity. The method may include transmitting an indication of a beam switching mode for reception of a communication spanning multiple slots. The method may include transmitting the communication in a first group of symbols of the multiple slots using a first beam in accordance with the beam switching mode. The method may include transmitting the communication in a second group of symbols of the multiple slots using a second beam in accordance with the beam switching mode.

Some aspects described herein relate to a non-transitory computer-readable medium that stores a set of instructions for wireless communication by a network node. The set of instructions, when executed by one or more processors of the network node, may cause the network node to receive an indication of a beam switching mode for reception of a communication spanning multiple slots. The set of instructions, when executed by one or more processors of the network node, may cause the network node to receive the communication in a first group of symbols of the multiple slots using a first beam in accordance with the beam switching mode. The set of instructions, when executed by one or more processors of the network node, may cause the network node to receive the communication in a second group of symbols of the multiple slots using a second beam in accordance with the beam switching mode.

Some aspects described herein relate to a non-transitory computer-readable medium that stores a set of instructions for wireless communication by a network entity. The set of instructions, when executed by one or more processors of the network entity, may cause the network entity to transmit an indication of a beam switching mode for reception of a communication spanning multiple slots. The set of instructions, when executed by one or more processors of the network entity, may cause the network entity to transmit the communication in a first group of symbols of the multiple slots using a first beam in accordance with the beam switching mode. The set of instructions, when executed by one or more processors of the network entity, may cause the network entity to transmit the communication in a second group of symbols of the multiple slots using a second beam in accordance with the beam switching mode.

Some aspects described herein relate to an apparatus for wireless communication. The apparatus may include means for receiving an indication of a beam switching mode for reception of a communication spanning multiple slots. The apparatus may include means for receiving the communication in a first group of symbols of the multiple slots using a first beam in accordance with the beam switching mode. The apparatus may include means for receiving the communication in a second group of symbols of the multiple slots using a second beam in accordance with the beam switching mode.

Some aspects described herein relate to an apparatus for wireless communication. The apparatus may include means for transmitting an indication of a beam switching mode for reception of a communication spanning multiple slots. The apparatus may include means for transmitting the communication in a first group of symbols of the multiple slots using a first beam in accordance with the beam switching mode. The apparatus may include means for transmitting the communication in a second group of symbols of the multiple slots using a second beam in accordance with the beam switching mode.

Some aspects described herein relate to a network node for wireless communication. The network node may include at least one memory and at least one memory communicatively coupled with the at least one memory. The at least one processor may be configured to cause the network node to receive an indication of a beam switching mode for reception of a communication spanning multiple slots. The at least one processor may be configured to cause the network node to receive or transmit the communication in a first group of symbols of the multiple slots using a first beam in accordance with the beam switching mode. The at least one processor may be configured to cause the network node to receive or transmit the communication in a second group of symbols of the multiple slots using a second beam in accordance with the beam switching mode.

Some aspects described herein relate to a network entity for wireless communication. The network entity may include at least one memory and at least one memory communicatively coupled with the at least one memory. The at least one processor may be configured to cause the network entity to transmit an indication of a beam switching mode for reception of a communication spanning multiple slots. The at least one processor may be configured to cause the network entity to transmit the communication in a first group of symbols of the multiple slots using a first beam in accordance with the beam switching mode. The at least one processor may be configured to cause the network entity to transmit the communication in a second group of symbols of the multiple slots using a second beam in accordance with the beam switching mode.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
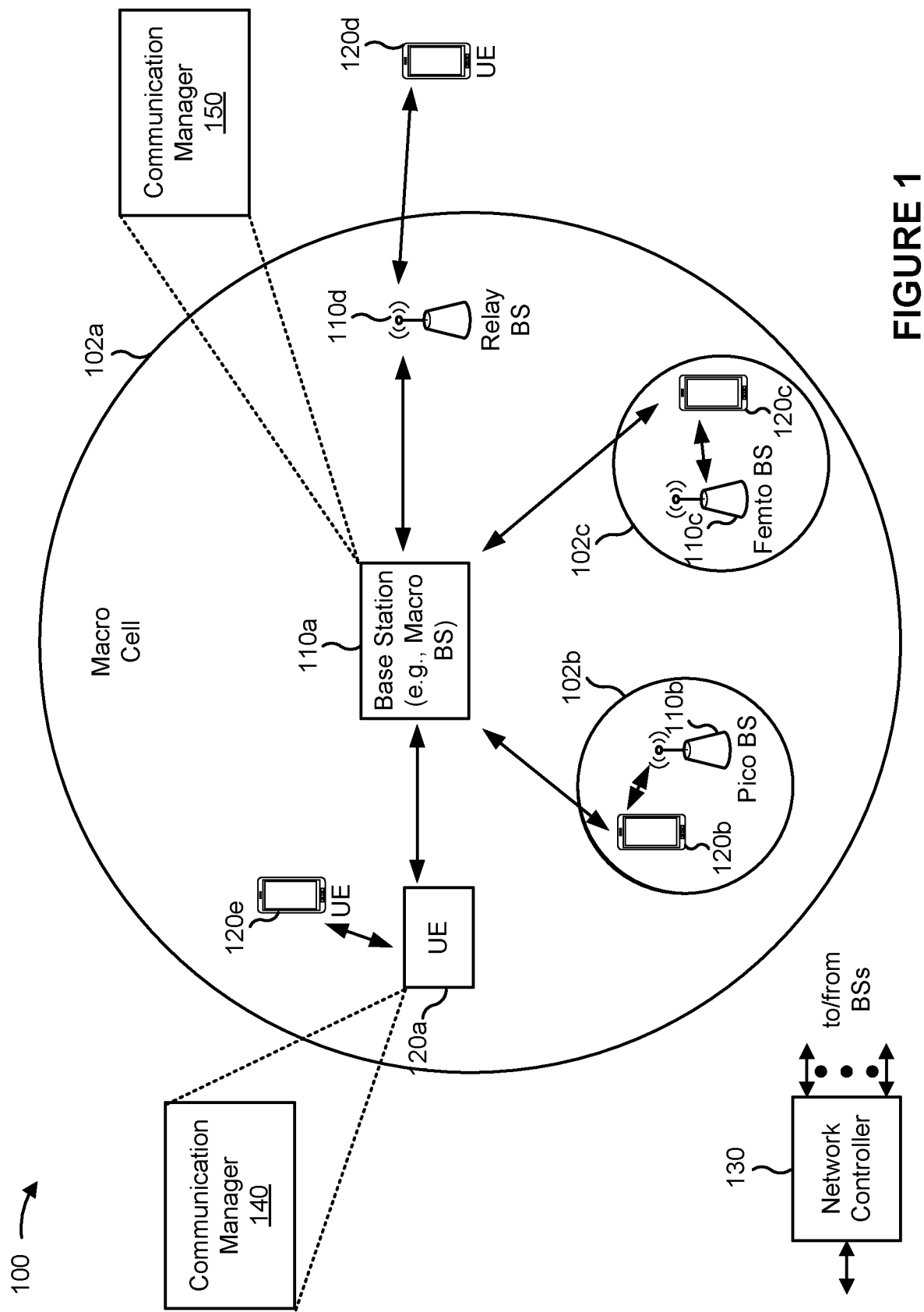
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Some radio access technologies (RATs), such as 5G New Radio (NR), enable the aggregation of multiple slots to facilitate a data transmission across the multiple slots. For example, when slots are not aggregated, a transport block (TB) may be transmitted in a single slot. When a group of slots are aggregated, the TB may be transmitted in each slot of the group of slots. A parameter (such as pdsch-AggregationFactor) may indicate a number of consecutive slots to be aggregated (and therefore the number of repetitions of the TB). Slot aggregation may be activated via a downlink control information (DCI) indication. As an example, consider a first slot including 14 symbols configured as downlink symbols, and a second slot, consecutive with the first slot, in which the first 12 symbols are downlink symbols. In this example, the first slot and the second slot can be aggregated, and the TB can be transmitted once in the 14 symbols of the first slot, and once in the first 12 symbols of the second slot. It should also be noted that slot aggregation can be used to for a single transmission of the TB (that is, part of the TB may be transmitted in the first slot and part of the TB may be transmitted in the second slot).

Traditionally, a beam pair used in a slot aggregation scenario (that is, a transmit beam of a network node and a receive beam of a UE) is a serving beam pair, unless a beam switching procedure is performed. The beam switching procedure may involve significant overhead, such as measurement of candidate beams, selection of beams, indication of selected beams, and reconfiguration of the UE and the network node to use the selected beams. This overhead may be prohibitive or problematic for switching of beams from symbol to symbol of a group of aggregated slots, which constrains spatial diversity of communications in the group of aggregated slots.

Various aspects relate generally to beam switching across aggregated slots. Some aspects more specifically relate to configuring and using a beam switching mode such that a receive beam of a UE is different in a first group of symbols (of the aggregated slots) than in a second group of symbols (of the aggregated slots). In some aspects, the beams can be selected by the UE, or can be signaled by the network. In some aspects, the UE may detect which beams are used, for example, using a low-complexity receiver, a self-steering array, a secondary radio frequency chain, or sub-sampling of one or more symbols.

Particular aspects of the subject matter described in this disclosure can be implemented to realize one or more of the following potential advantages. In some examples, the described techniques can be used to improve spatial diversity relative to using the same serving beam across an entire group of aggregated slots. Selecting the beams at the UE may reduce signaling complexity. Signaling information indicating the beams may reduce processor usage at the UE. Detecting which beams are used (for example, using a low-complexity receiver such as those in a wake-up receiver circuitry, a self-steering array, a secondary radio frequency chain, or sub-sampling of one or more symbols) may increase flexibility of beam selection relative to explicitly signaling selected beams. Furthermore, beam switching across aggregated slots can improve the utilization of multipaths and clusters of the channel.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a network node (e.g., UE 120) may include a communication manager 140. As described in more detail elsewhere herein, the communication manager 140 may receive an indication of a beam switching mode for reception of a communication spanning multiple slots; receive the communication in a first group of symbols of the multiple slots using a first beam in accordance with the beam switching mode; and receive the communication in a second group of symbols of the multiple slots using a second beam in accordance with the beam switching mode. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit an indication of a beam switching mode for reception of a communication spanning multiple slots; transmit the communication in a first group of symbols of the multiple slots using a first beam in accordance with the beam switching mode; and transmit the communication in a second group of symbols of the multiple slots using a second beam in accordance with the beam switching mode. Additionally, or alternatively, the communication manager 150 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 2:
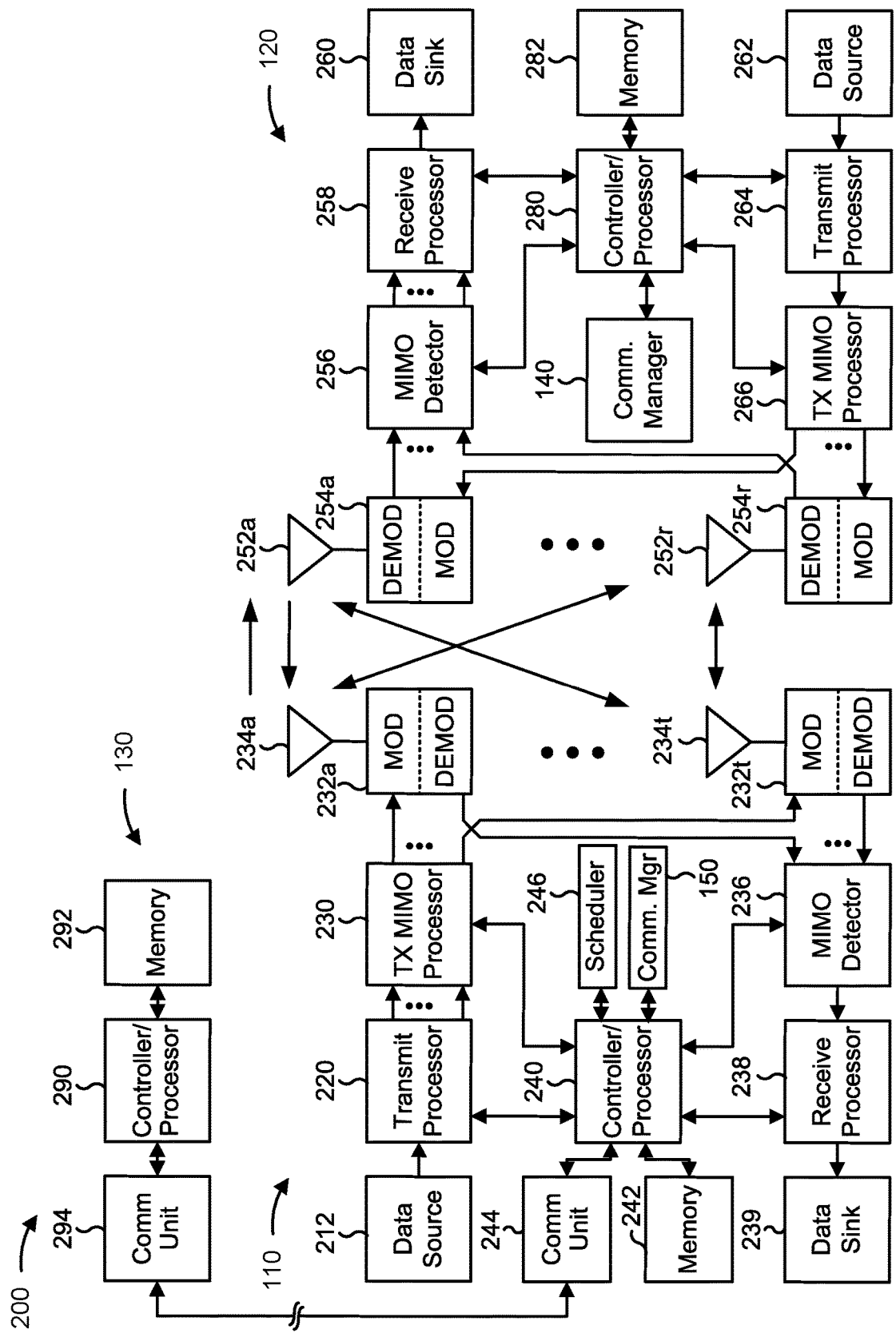
FIG. 2 is a diagram illustrating an example base station in communication with a user equipment (UE) in a wireless network in accordance with the present disclosure.

FIG. 2 is a diagram illustrating an example 200 of a base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with providing diversity across slots with beam switches, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the network node includes means for receiving an indication of a beam switching mode for reception of a communication spanning multiple slots; means for receiving the communication in a first group of symbols of the multiple slots using a first beam in accordance with the beam switching mode; and/or means for receiving the communication in a second group of symbols of the multiple slots using a second beam in accordance with the beam switching mode. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting an indication of a beam switching mode for reception of a communication spanning multiple slots; means for transmitting the communication in a first group of symbols of the multiple slots using a first beam in accordance with the beam switching mode; and/or means for transmitting the communication in a second group of symbols of the multiple slots using a second beam in accordance with the beam switching mode. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
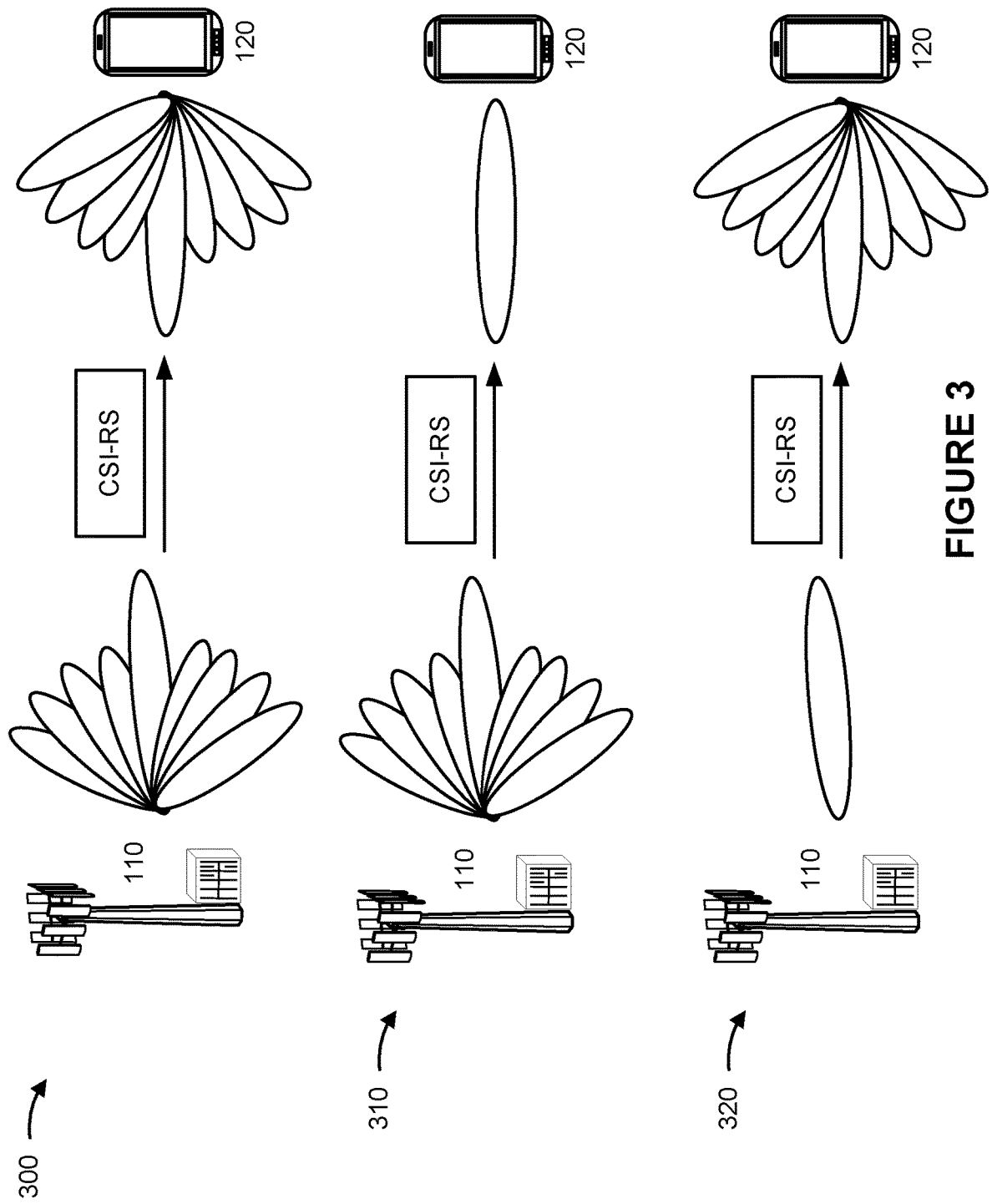
FIG. 3 is a diagram illustrating examples of channel state information reference signal beam management procedures in accordance with the present disclosure.

FIG. 3 is a diagram illustrating examples 300, 310, and 320 of CSI-RS beam management procedures in accordance with the present disclosure. The beam management procedures depicted in FIG. 3 may facilitate a beam switching procedure, as described elsewhere herein. As shown in FIG. 3, examples 300, 310, and 320 include a UE 120 in communication with a base station 110 in a wireless network (for example, wireless network 100). However, the devices shown in FIG. 3 are provided as examples, and the wireless network may support communication and beam management between other devices (for example, between a UE 120 and a base station 110 or TRP, between a mobile termination node and a control node, between an IAB child node and an IAB parent node, between a scheduled node and a scheduling node, or between a UE 120 and a radio unit or distributed unit of a disaggregated RAN node). In some aspects, the UE 120 and the base station 110 may be in a connected state (for example, a radio resource control (RRC) connected state).

As shown in FIG. 3, example 300 may include a base station 110 and a UE 120 communicating to perform beam management using CSI-RSs. Example 300 depicts a first beam management procedure (for example, P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (for example, using RRC signaling), semi-persistent (for example, using media access control (MAC) control element (MAC-CE) signaling), and/or aperiodic (for example, using DCI).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (for example, with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (for example, P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (for example, using DCI). The second beam management procedure may include the base station 110 performing beam sweeping over one or more transmit beams. The one or more transmit beams may be a subset of all transmit beams associated with the base station 110 (for example, determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (for example, a same) receive beam (for example, determined based at least in part on measurements performed in connection with the first beam management procedure). The second beam management procedure may enable the base station 110 to select a best transmit beam based at least in part on measurements of the CSI-RSs (for example, measured by the UE 120 using the single receive beam) reported by the UE 120.

As shown in FIG. 3, example 320 depicts a third beam management procedure (for example, P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (for example, using DCI). The third beam management process may include the base station 110 transmitting the one or more CSI-RSs using a single transmit beam (for example, determined based at least in part on measurements reported by the UE 120 in connection with the first beam management procedure and/or the second beam management procedure). To enable the UE 120 to perform receive beam sweeping, the base station may use a transmit beam to transmit (for example, with repetitions) CSI-RS at multiple times within the same RS resource set so that UE 120 can sweep through one or more receive beams in multiple transmission instances. The one or more receive beams may be a subset of all receive beams associated with the UE 120 (for example, determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (for example, of the CSI-RS of the transmit beam using the one or more receive beams). Thus, the UE 120 and the base station 110 may select and refine a suitable serving beam pair for communications of the UE 120 and the base station 110.

The usage of the beam management procedures described with regard to FIG. 3 may provide a suitable serving beam pair for communications of the UE 120 and the base station 110. For example, the serving beam pair may be associated with a path along a best cluster in a channel between the UE 120 and the base station 110. A cluster may represent a spatial region with relatively strong signal strength (such as signal strength higher than a threshold, or signal strength sufficient to support the communication link between the UE 120 and the base station 110). For example, a cluster may be observed on a direct path between the UE 120 and the base station 110. Furthermore, in some environments (such as indoor deployments), there may be several clusters that provide relatively strong signal strength. For example, there may be a median of 5 to 6 clusters observed in 28 GHz measurements in indoor office and shopping mall deployments, and these 5 to 6 clusters may provide signal strengths sufficient to support diversity via directional beamforming. These large numbers of clusters may be associated with reflectors such as glass, metal or smooth surfaces in buildings. As mentioned above, the serving beam is typically along the best cluster in the channel, but the other clusters (which may be referred to as non-serving clusters) can also afford good signal strengths, which may facilitate improved throughput and coverage of the communication link between the UE 120 and the base station 110. However, switching to such clusters using the beam management procedures of FIG. 3 may impose significant overhead and may be difficult at a sub-slot granularity.

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
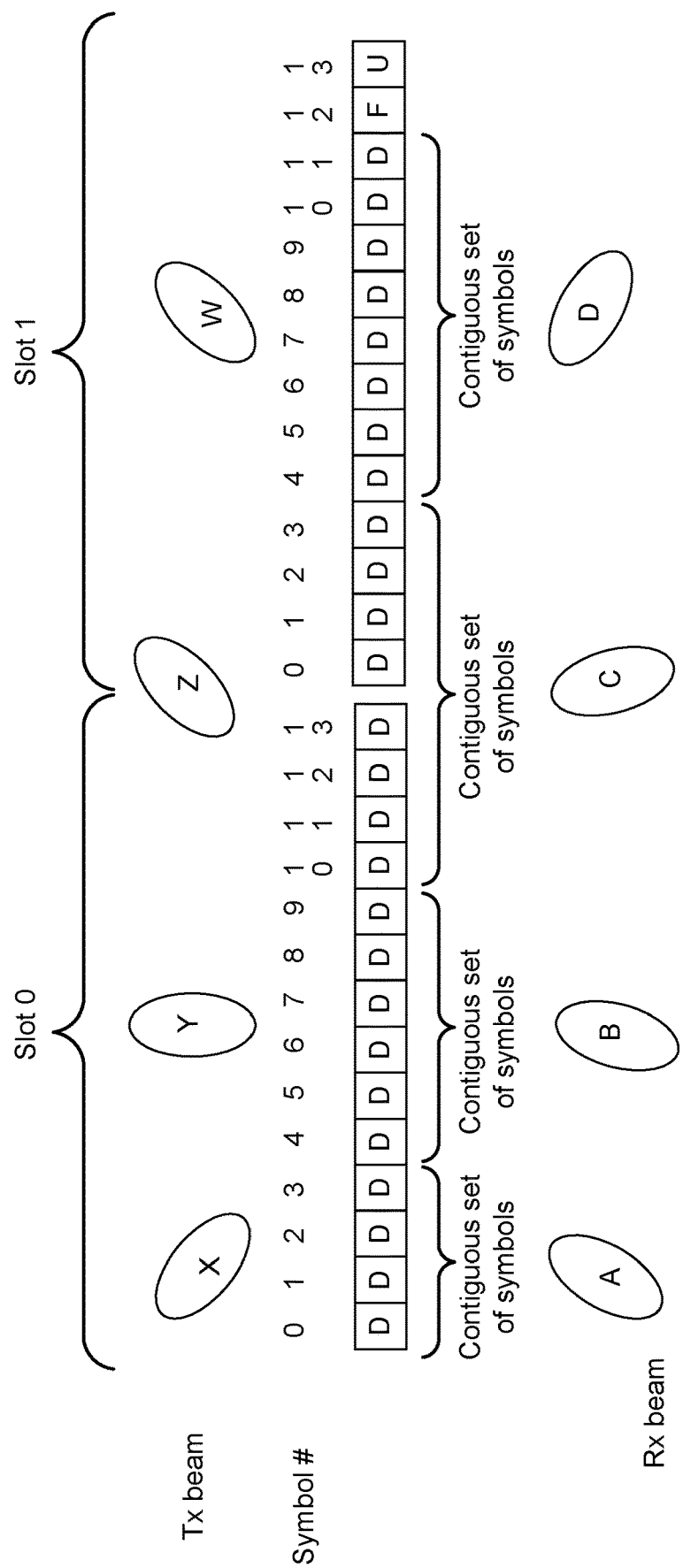
FIG. 4 is a diagram illustrating switching of a beam pair in accordance with a beam switching mode in accordance with the present disclosure.

Some techniques described herein enable switching of a beam pair (such as a receive beam at the UE 120 and a transmit beam at the base station 110 or a transmit beam at the UE 120 and a receive beam at the base station 110) in accordance with a beam switching mode. FIG. 4 is a diagram illustrating switching of a beam pair in accordance with a beam switching mode. FIG. 4 depicts a first slot (Slot 0) and a second slot (Slot 1). The first slot and the second slot each include 14 symbols. The first slot has 14 downlink symbols (indicated by "D"). A downlink symbol is a symbol used for downlink communication. The second slot has downlink symbols 0 through 11, a flexible symbol 12 (indicated by "F"), and an uplink symbol 13 (indicated by "U"). A flexible symbol can be configured for either uplink or downlink communication. An uplink symbol is a symbol used for uplink communication.

The transmission timeline for each of the downlink and uplink may be partitioned into units of radio frames (sometimes referred to as frames). Each radio frame may have a predetermined duration (such as 10 milliseconds (ms)) and may be partitioned into a set of subframes. Each subframe may have a predetermined duration (such as 1 ms) and may include a set of slots (where a quantity of the set of slots is defined by a numerology configuration). Each slot may include a set of symbols (sometimes referred to as symbol periods). For example, each slot may include fourteen symbols, seven symbol periods, or another number of symbol periods.

In FIG. 4, the first slot and the second slot may be aggregated. For example, a UE may receive configuration information indicating a number of slots to be aggregated (in this example, two) and may receive an indication to activate slot aggregation. Thus, the UE may expect a same TB to be transmitted or received in the first slot and the second slot (such as multiple repetitions of the TB, or a first part of the TB in the first slot and a second part of the TB in the second slot).

As shown, the UE and a network entity may switch an active beam pair in different sets of symbols of the first slot and the second slot. In FIG. 4, there are 4 sets of symbols, and each set of symbols comprises one or more symbols. If there are multiple symbols in a set of symbols, the multiple symbols may be contiguous with one another. As shown, a third set of symbol spans the slot boundaries of the first slot and the second slot. The UE and the network entity may switch the active beam pair in accordance with a beam switching mode, which is described in connection with FIG. 5.

As shown, a first beam pair "X-A" including a transmit beam X at the network entity and a receive beam A at the UE is used in a first set of slots. As shown, a second beam pair "Y-B" including a transmit beam Y at the network entity and a receive beam B at the UE is used in a second set of slots. As shown, a third beam pair "Z-C" including a transmit beam Z at the network entity and a receive beam C at the UE is used in a third set of slots. As shown, a fourth beam pair "W-D" including a transmit beam W at the network entity and a receive beam D at the UE is used in a first set of slots.

Thus, spatial diversity is increased relative to using a same serving beam pair throughout the first slot and the second slot. Furthermore, the beams are switched without explicit beam management signaling (such as described with regard to FIG. 3) during the first slot or the second slot. Since the UE needs to know that a beam has been switched to take advantage of the spatial diversity offered by a different choice of beams, the UE performs beam-based scanning which can be speeded up by the use of special circuitry or low-complexity circuitry that allows detection of different beam choices within a fixed time overhead with minimal hardware overhead. It should be noted that the beam pairs illustrated in FIG. 4 can also be composed of transmit beams at the UE and receive beams at the base station.

In some aspects, the four beam pairs may be associated with different clusters in the channel between the UE and the network entity. For example, each beam pair may have a path corresponding to a different cluster. Thus, spatial diversity is improved, which may increase throughput, reliability, and coverage of communications between the UE and the network entity. Improving throughput, reliability, and coverage may be beneficial in slot aggregation scenarios, since slot aggregation may be used to mitigate poor coverage conditions.

Figure 5:
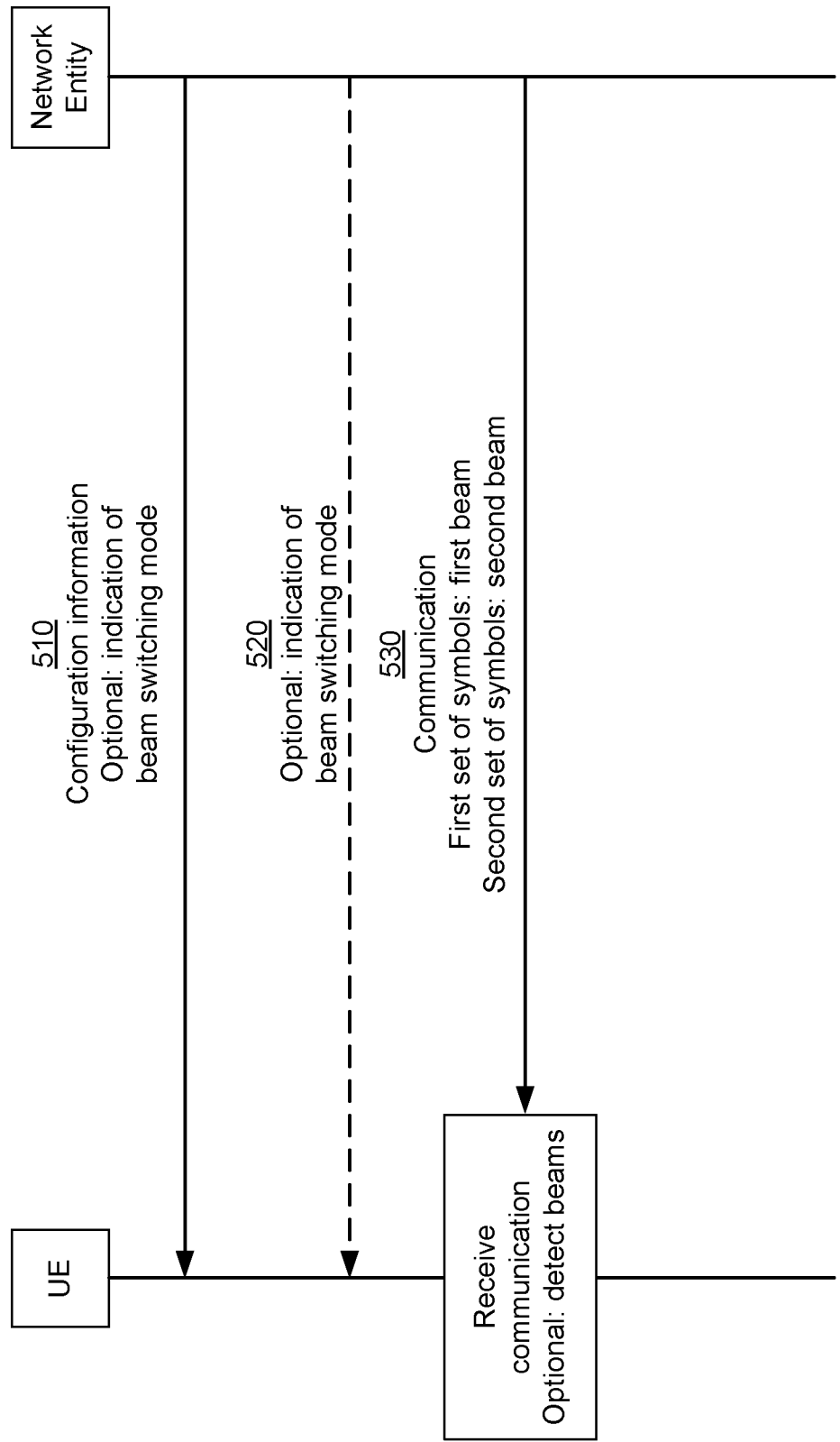
FIG. 5 is a diagram illustrating signaling associated with a beam switching mode in accordance with the present disclosure.

FIG. 5 is a diagram illustrating signaling associated with a beam switching mode in accordance with the present disclosure. FIG. 5 includes a UE (such as UE 120) and a network entity (such as base station 110, a central unit, a distributed unit, a radio unit, or a combination thereof). The UE may be referred to elsewhere herein as a network node.

As shown in FIG. 5, the network entity may transmit, and the UE may receive, configuration information 510. The configuration information 510 may be transmitted via RRC signaling, MAC signaling, DCI, capability information (such as a dynamic capability), or a combination thereof. Dynamic capability corresponds to the selection at the UE side of different capability levels based on the use cases or applications to optimize power-performance metrics from within a choice of available capability levels. As an example, consider a UE equipped with a B=5 bit phase precision and a $B_1=4$ bit amplitude precision per antenna element. This corresponds to the best possible phase and amplitude precision that can be used per antenna element and is a hardware capability. In practice, the UE can use any B≤5 bit phase precision and any $B_1$≤4 bit amplitude precision from within the available choices. This dynamic selection of a capability from within the best possible capability made available by the hardware is useful for optimizing power or performance (as the case may be in different applications). In some aspects, the configuration information 510 may include multiple different communications, such as one or more configurations (such as RRC configurations), one or more MAC control elements, one or more DCI transmissions, or a combination thereof.

In some aspects, the configuration information 510 may identify a group of slots. For example, the configuration information 510 may include a parameter that indicates how many consecutive slots can be aggregated. As another example, the configuration information 510 may include an activation of a slot aggregation mode. As still another example, the configuration information 510 may schedule a communication (such as a transmission of a TB) that spans the group of slots. In some aspects, the configuration information 510 may include a parameter associated with the group of slots, such as a slot format indicator (SFI) associated with the first slot and an SFI associated with the second slot.

In some aspects, the configuration information 510 may include an indication of a beam switching mode. For example, the configuration information 510 may configure and/or activate the beam switching mode. In some other aspects, the indication of the beam switching mode may be provided in a communication 520 separate from the configuration information 510. In some aspects, the configuration information 510 or the indication of the beam switching mode may include one or more configurations associated with the beam switching mode. In some aspects, the indication of the beam switching mode may be associated with an SFI. For example, the indication of the beam switching mode may be provided in a same communication as the SFI, or the SFI may indicate the beam switching mode. In some aspects, the beam switching mode may be across multiple slots (such as aggregated slots) for diversity purposes.

In some aspects, a configuration may indicate a number of allowed beam switches within the set of slots. For example, the number of allowed beam switches may be configured by the network entity autonomously (such as without receiving a request from the UE). As another example, the number of allowed beam switches may be configured based at least in part on a request from the UE (where the request may indicate the number of allowed beam switches, a maximum number of allowed beam switches, a capability associated with a number of allowed beam switches, or the like). In some aspects, the number of allowed beam switches may be based at least in part on a number of slots of the set of slots. For example, a relationship may be defined between the number of slots and the number of allowed beam switches (such as "two beam switches per slot," "a maximum of five beam switches across two slots," "a maximum of X beam switches across Y slots," or the like). In some aspects, the number of allowed beam switches may be based at least in part on an operating frequency of the UE (for example, more beam switches may be allowed at a higher operating frequency than at a lower operating frequency). In some aspects, the number of allowed beam switches may be based at least in part on a diversity level (such as a richness) possible with the channel. The diversity level may be measured by the UE, such as in beam training. The diversity level possible with the channel may indicate how many clusters are present in the channel, how many different beam pairs can be supported by the channel, how many beam pairs are associated with a threshold signal strength, or the like. In some aspects, the number of allowed beam switches may be based at least in part on a beam switching latency of the UE. A beam switching latency may indicate how long the UE takes to switch from a first beam to a second beam. A longer beam switching latency may lead to fewer allowed beam switches than a shorter beam switching latency. In some aspects, the number of allowed beam switches may be based at least in part on a hardware configuration at the UE or the network entity. The hardware configuration may include at least one of a circuit level latency, bus latency, circuit related settling time aspects, an antenna configuration of the UE or the network entity, an antenna gain of the UE or the network entity, or the like. In some aspects, the number of allowed beam switches may be based at least in part on a diversity requirement for a use case associated with the communication. A diversity requirement may indicate a minimum number of beam switches or may indicate that a spatial diversity technique is to be used for the communication on the set of slots. In some aspects, the number of allowed beam switches may be based at least in part on two or more of the above factors.

In some aspects, a configuration may indicate a set of symbols over which beam switching is performed. For example, the network entity may configure one or more sets of symbols over which beam switching is performed. In some aspects, the configuration may explicitly identify the one or more sets of symbols (e.g., "symbols 1, 2, and 3 are in a first set, and symbols 4, 5, and 6 are in a second set"). In some other aspects, the configuration may indicate how many symbols are included in a set of symbols (e.g., "there are four symbols per set of symbols"), and the UE may determine the sets of symbols accordingly.

In some aspects, a configuration may indicate a set of beams for the beam switching mode. For example, a configuration may explicitly indicate that a particular beam is to be used for a particular set of symbols. As another example, a configuration may indicate a set of beams, and the UE may use beams of the set of beams to receive or transmit a communication on different sets of symbols (e.g., one beam of the set of beams per set of symbols of the sets of symbols). For example, the configuration may indicate an order associated with a group of beams, and the UE may cycle through the group of beams according to the order for reception or transmission of the communication in the sets of symbols. In some aspects, the set of beams may be selected based at least in part on a metric associated with the set of beams. For example, the UE may report the metric regarding a plurality of beams, and the network entity may select the set of beams based at least in part on the metric. In some aspects, the metric may be a signal strength metric (for example, the set of beams may include beams with a threshold signal strength). The metric may be reported via transmission configuration indicator (TCI) state feedback over SSBs, via CSI-RS or sounding reference signal beam refinement signaling, or the like.

In some aspects, the set of beams may be selected (by the network entity or the UE) based at least in part on one or more factors. For example, the network entity may select its own beams and/or beams to be used by the UE. The one or more factors may include power consumption, thermal overhead, signal strength improvement, ease of beam switching, a combination thereof, or the like. As one example, the set of beams may be selected to optimize power consumption relative to other beams of a plurality of beams. As another example, the set of beams may be selected to mitigate thermal overhead at the UE or the network entity. As yet another example, the set of beams may be selected to optimize signal strength at the UE. As still another example, the set of beams may be selected based at least in part on how easy a transition from one beam to another beam is for the UE or the network entity (such as based at least in part on a beam switching latency, a required reconfiguration of beamforming hardware of the UE, a circuit-level transient, a beam management capability, or the like).

As shown by reference number 530, the network entity may transmit, and the UE may receive, a communication. Alternatively, the UE may transmit, and the network entity may receive, the communication. The communication may be transmitted and received in accordance with the beam switching mode (such as the indication of the beam switching mode) and the configuration information 510. For example, the communication may be transmitted and received using one or more of the configurations described with regard to the configuration information 510 or the communication 520. In some aspects, the network entity may transmit (or receive), and the UE may receive (or transmit), the communication in a first group of symbols of the set of slots using a first beam. The network entity may transmit (or receive), and the UE may receive (or transmit), the communication in a second group of symbols of the set of slots using a second beam.

In some aspects, the UE may detect that a particular beam is used for a particular set of symbols. For example, the UE may not receive a configuration indicating an order and/or a set of beams for the beam switching mode. The UE may detect the order and/or identity of the set of beams. For example, the UE may perform detection at a symbol granularity or a sub-symbol granularity. In some examples, to perform detection, the UE may measure a signal strength, such as at a predefined resource (which may correspond to a reference signal), and the UE may identify a beam based at least in part on whether the signal strength satisfies a threshold. In some aspects, the UE may perform a symbol-level detection of power, peak of voltage, or current on the UE's receive path with different hypotheses of beams (e.g., the UE may perform the symbol-level detection using a first beam, then using a second beam, and so on, until a hypothesis is confirmed). In some aspects, the UE may perform the detection based at least in part on an indication (e.g., configuration) of one or more sets of symbols. For example, the UE may perform the detection (such as of power, peak voltage, or current) only during the one or more sets of symbols.

In some aspects, the UE may perform the detection using a component of the UE. For example, the UE may perform the detection using a low-complexity receiver. A low-complexity receiver is a receiver (e.g., receiver circuitry, a radio frequency chain, or the like) separate from a main receiver of the UE. For example, a low-complexity receiver may include a wake-up receiver (e.g., a receiver used to receive paging or wakeup signaling while the UE is in a sleep mode). In some aspects, a low-complexity receiver may not include a mixer, an analog-digital converter (ADC), or a digital-analog converter (DAC), which may eliminate the need for down-conversion to the intermediate frequency or baseband. A low-complexity receiver may not perform demodulation, in some aspects. In some aspects, the UE may perform the detection using a self-steering array. A self-steering array is an antenna array that can autonomously perform beam steering. For example, a self-steering array may include a phase-shifting array and a radio frequency power-tracking control circuit that steers beams of the self-steering array. In some aspects, the self-steering array may be associated with a state machine that cycles through multiple beam directions and detects received signal amplitude in each of the multiple beam directions. In some aspects, the UE may perform the detection using a secondary radio frequency chain. For example, the UE may receive a TB of the communication using a first radio frequency chain, and the UE may perform the detection using a second radio frequency chain. In some aspects, the UE may perform the detection using sub-sampling of one or more symbols. "Sub-sampling" refers to performing multiple measurements within a symbol. For example, the UE may perform detection for a first beam, and for a second beam, at different times within a symbol.

In some aspects, the network entity may transmit (or receive), and the UE may receive (or transmit), the communication using a frequency diversity mode. For example, the communication may be transmitted using a frequency hopping configuration where different frequency allocations are used over different resources. In some aspects, the network entity may transmit (or receive), and the UE may receive (or transmit), the communication using a time diversity mode. For example, the communication may be transmitted using a configuration in which the communication is transmitted at a variety of times to improve diversity. In some aspects, the network entity may transmit (or receive), and the UE may receive (or transmit), the communication using a code diversity mode. For example, the communication may be transmitted using an encoding scheme, such as using a code division multiplexing scheme, to improve diversity.

Figure 6:
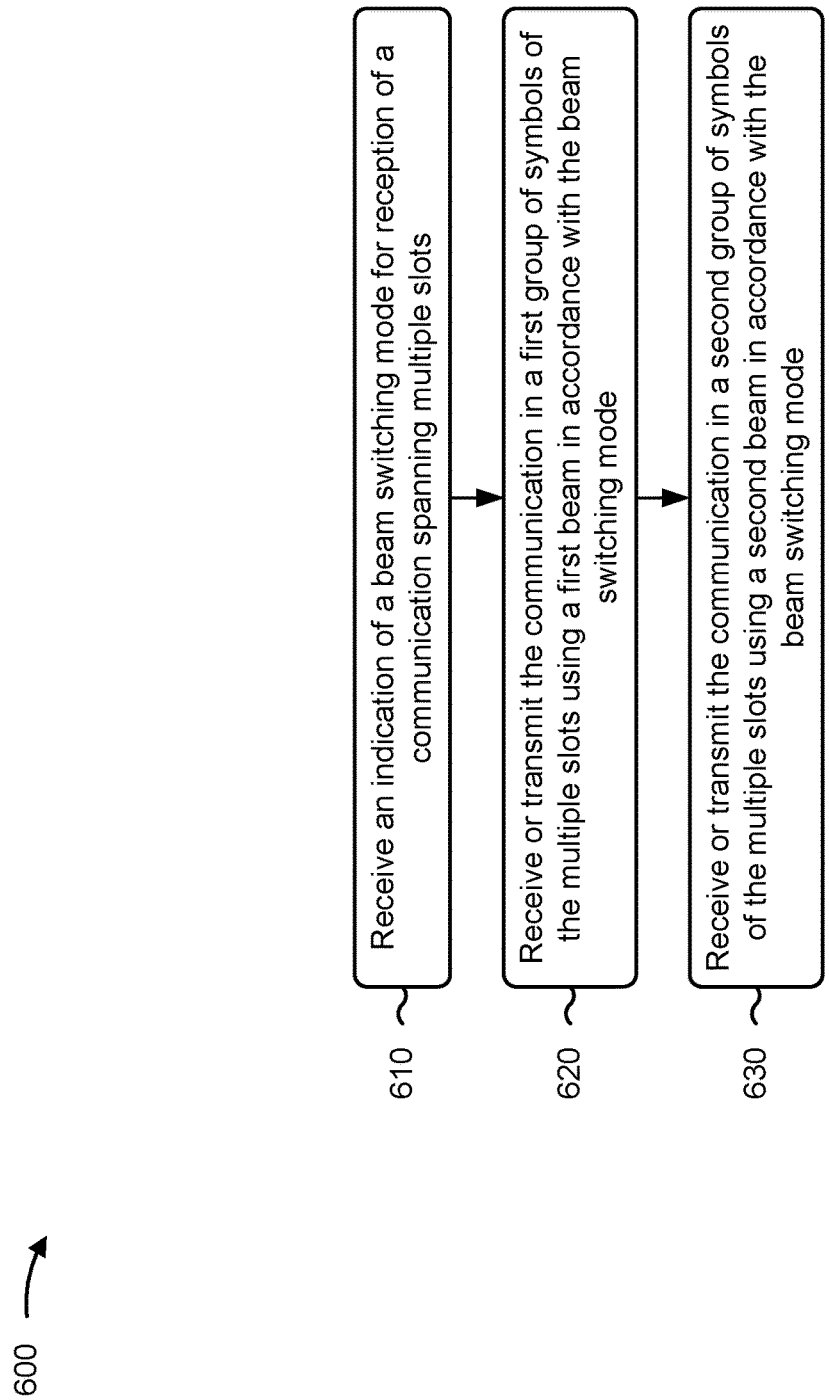
FIG. 6 is a flowchart illustrating an example process performed, for example, by a network node in accordance with the present disclosure.

FIG. 6 is a flowchart illustrating an example process 600 performed, for example, by a network node in accordance with the present disclosure. Example process 600 is an example where the network node (for example, UE 120, the UE of FIGS. 4 and 5) performs operations associated with diversity across slots with beam switching.

As shown in FIG. 6, in some aspects, process 600 may include receiving an indication of a beam switching mode for reception of a communication spanning multiple slots (block 610). For example, the network node (such as by using communication manager 140 or reception component 802, depicted in FIG. 8) may receive an indication of a beam switching mode for reception of a communication spanning multiple slots, as described above.

As further shown in FIG. 6, in some aspects, process 600 may include receiving or transmitting the communication in a first group of symbols of the multiple slots using a first beam in accordance with the beam switching mode (block 620). For example, the network node (such as by using communication manager 140 or beamforming component 808, depicted in FIG. 8) may receive or transmit the communication in a first group of symbols of the multiple slots using a first beam in accordance with the beam switching mode, as described above.

As further shown in FIG. 6, in some aspects, process 600 may include receiving or transmitting the communication in a second group of symbols of the multiple slots using a second beam in accordance with the beam switching mode (block 630). For example, the network node (such as by using communication manager 140 or beamforming component 808, depicted in FIG. 8) may receive or transmit the communication in a second group of symbols of the multiple slots using a second beam in accordance with the beam switching mode, as described above.

Process 600 may include additional aspects, such as any single aspect or any combination of aspects described below or in connection with one or more other processes described elsewhere herein.

In a first additional aspect, the indication is associated with a selection of a slot format indicator.

In a second additional aspect, alone or in combination with the first aspect, the indication is received via at least one of information, downlinking control information signaling, medium access control signaling, or radio resource control signaling.

In a third additional aspect, alone or in combination with one or more of the first and second aspects, process 600 includes receiving a configuration of a number of allowed beam switches within the multiple slots.

In a fourth additional aspect, alone or in combination with one or more of the first through third aspects, the number of allowed beam switches is based at least in part on a number of slots of the multiple slots.

In a fifth additional aspect, alone or in combination with one or more of the first through fourth aspects, the number of allowed beam switches is based at least in part on at least one of an operating frequency, a diversity of a channel associated with the communication, a beam switching latency, a hardware configuration, or a diversity requirement.

In a sixth additional aspect, alone or in combination with one or more of the first through fifth aspects, process 600 includes receiving a configuration indicating the first group of symbols and the second group of symbols.

In a seventh additional aspect, alone or in combination with one or more of the first through sixth aspects, the first beam and the second beam are selected from a group of beams reported by the network node based at least in part on a metric associated with the first beam and the second beam.

In an eighth additional aspect, alone or in combination with one or more of the first through seventh aspects, the first beam and the second beam are selected based at least in part on at least one of a power consumption, a thermal overhead, a signal strength improvement, or an ease of beam switching.

In a ninth additional aspect, alone or in combination with one or more of the first through eighth aspects, the indication indicates an order, for the beam switching mode, associated with a group of beams including the first beam and the second beam.

In a tenth additional aspect, alone or in combination with one or more of the first through ninth aspects, receiving the communication in the first group of symbols using the first beam further comprises detecting that the first beam is used in the first group of symbols.

In an eleventh additional aspect, alone or in combination with one or more of the first through tenth aspects, the detection is performed at a symbol granularity.

In a twelfth additional aspect, alone or in combination with one or more of the first through eleventh aspects, the detection is based at least in part on a configuration indicating the first group of symbols.

In a thirteenth additional aspect, alone or in combination with one or more of the first through twelfth aspects, the detection is performed using at least one of a low-complexity receiver, a self-steering array, a secondary radio frequency chain, or sub-sampling of one or more symbols of the first group of symbols.

In a fourteenth additional aspect, alone or in combination with one or more of the first through thirteenth aspects, receiving the communication in the first group of symbols of the multiple slots using the first beam further comprises receiving the communication using at least one of a frequency diversity mode, a time diversity mode, or a code diversity mode.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
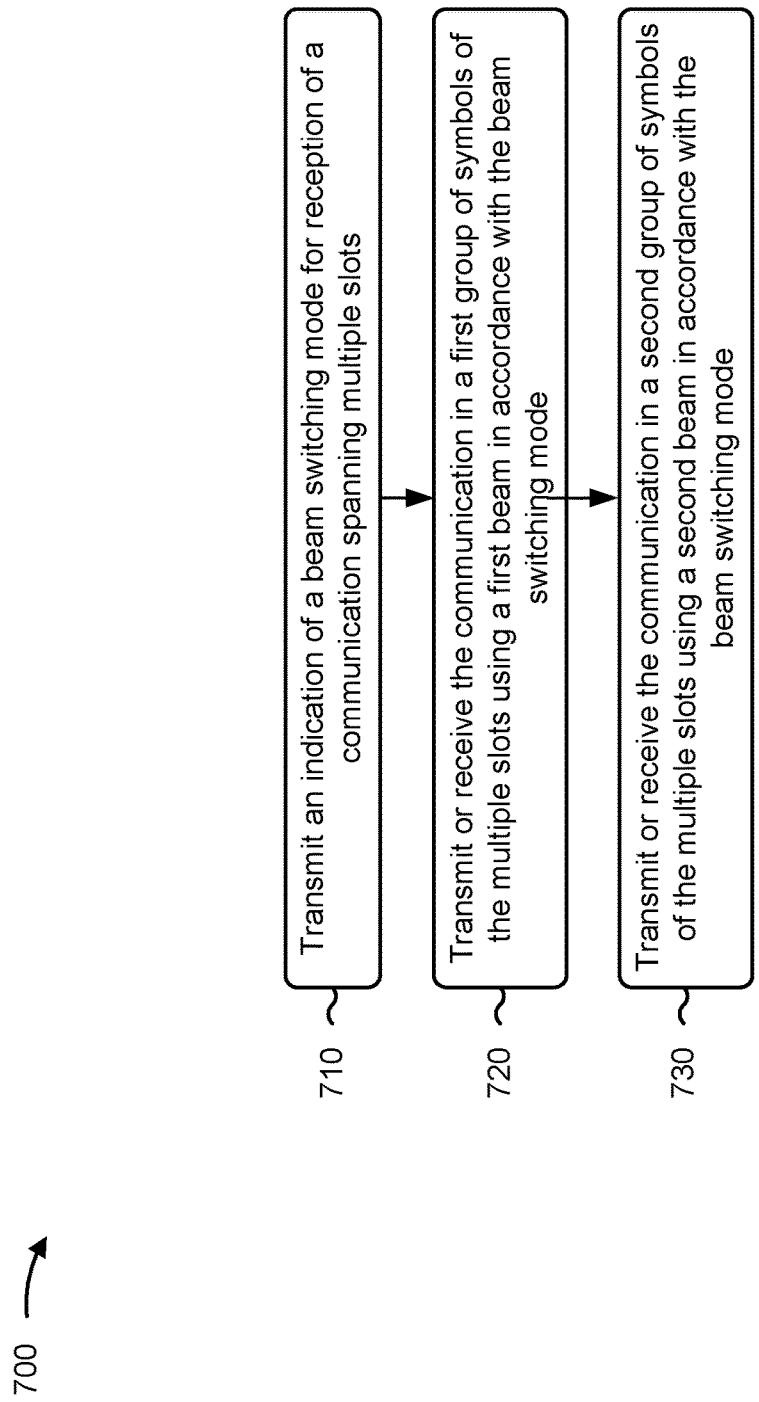
FIG. 7 is a flowchart illustrating an example process performed, for example, by a network entity in accordance with the present disclosure.

FIG. 7 is a flowchart illustrating an example process 700 performed, for example, by a network entity in accordance with the present disclosure. Example process 700 is an example where the network entity (for example, base station 110, a central unit (CU), a distributed unit (DU), a radio unit (RU), or a combination thereof) performs operations associated with diversity across slots with beam switching.

As shown in FIG. 7, in some aspects, process 700 may include transmitting an indication of a beam switching mode for reception of a communication spanning multiple slots (block 710). For example, the network entity (such as by using communication manager 150 or transmission component 904, depicted in FIG. 9) may transmit an indication of a beam switching mode for reception of a communication spanning multiple slots, as described above.

As further shown in FIG. 7, in some aspects, process 700 may include transmitting or receiving the communication in a first group of symbols of the multiple slots using a first beam in accordance with the beam switching mode (block 720). For example, the network entity (such as by using communication manager 150 or beamforming component 908, depicted in FIG. 9) may transmit or receive the communication in a first group of symbols of the multiple slots using a first beam in accordance with the beam switching mode, as described above.

As further shown in FIG. 7, in some aspects, process 700 may include transmitting or receiving the communication in a second group of symbols of the multiple slots using a second beam in accordance with the beam switching mode (block 730). For example, the network entity (such as by using communication manager 150 or beamforming component 908, depicted in FIG. 9) may transmit or receive the communication in a second group of symbols of the multiple slots using a second beam in accordance with the beam switching mode, as described above.

Process 700 may include additional aspects, such as any single aspect or any combination of aspects described below or in connection with one or more other processes described elsewhere herein.

In a first additional aspect, the indication is associated with a selection of a slot format indicator.

In a second additional aspect, alone or in combination with the first aspect, the indication is transmitted via at least one of information, downlinking control information signaling, medium access control signaling, or radio resource control signaling.

In a third additional aspect, alone or in combination with one or more of the first and second aspects, process 700 includes transmitting a configuration of a number of allowed beam switches within the multiple slots.

In a fourth additional aspect, alone or in combination with one or more of the first through third aspects, the number of allowed beam switches is based at least in part on a number of slots of the multiple slots.

In a fifth additional aspect, alone or in combination with one or more of the first through fourth aspects, the number of allowed beam switches is based at least in part on at least one of an operating frequency, a diversity of a channel associated with the communication, a beam switching latency, a hardware configuration, or a diversity requirement.

In a sixth additional aspect, alone or in combination with one or more of the first through fifth aspects, process 700 includes transmitting a configuration indicating the first group of symbols and the second group of symbols.

In a seventh additional aspect, alone or in combination with one or more of the first through sixth aspects, the first beam and the second beam are selected from a reported group of beams based at least in part on a metric associated with the first beam and the second beam.

In an eighth additional aspect, alone or in combination with one or more of the first through seventh aspects, the first beam and the second beam are selected based at least in part on at least one of a power consumption, a thermal overhead, a signal strength improvement, or an ease of beam switching.

In a ninth additional aspect, alone or in combination with one or more of the first through eighth aspects, the indication indicates an order, for the beam switching mode, associated with a group of beams including the first beam and the second beam.

In a tenth additional aspect, alone or in combination with one or more of the first through ninth aspects, transmitting the communication in the first group of symbols of the multiple slots using the first beam further comprises transmitting the communication using at least one of a frequency diversity mode, a time diversity mode, or a code diversity mode.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
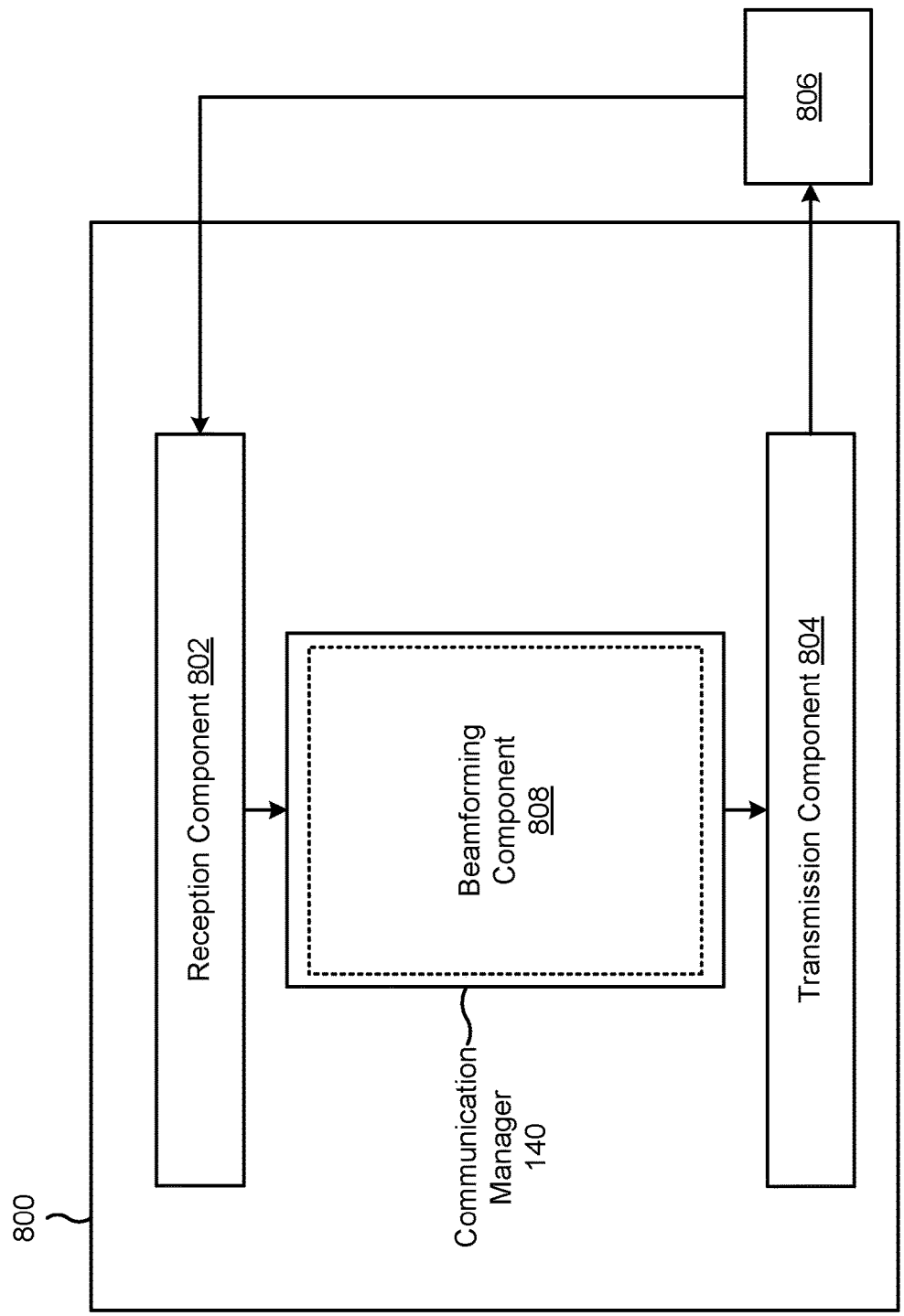
FIG. 8 is a diagram of an example apparatus for wireless communication in accordance with the present disclosure.

FIG. 8 is a diagram of an example apparatus 800 for wireless communication in accordance with the present disclosure. The apparatus 800 may be a network node, or a network node may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 3-5. Additionally or alternatively, the apparatus 800 may be configured to perform one or more processes described herein, such as process 600 of FIG. 6, or a combination thereof. In some aspects, the apparatus 800 may include one or more components of the network node described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the network node described above in connection with FIG. 2.

The transmission component 804 may transmit communications, such as reference signals, control information, data communications, or a combination thereof, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described above in connection with FIG. 2. In some aspects, the transmission component 804 may be co-located with the reception component 802 in a transceiver.

The communication manager 140 may receive or may cause the reception component 802 to receive an indication of a beam switching mode for reception of a communication spanning multiple slots. The communication manager 140 may receive or may cause the reception component 802 or the transmission component 802 to receive or transmit the communication in a first group of symbols of the multiple slots using a first beam in accordance with the beam switching mode. The communication manager 140 may receive or may cause the reception component 802 or the transmission component 802 to receive or transmit the communication in a second group of symbols of the multiple slots using a second beam in accordance with the beam switching mode. In some aspects, the communication manager 140 may perform one or more operations described elsewhere herein as being performed by one or more components of the communication manager 140.

The communication manager 140 may include a controller/processor, a memory, or a combination thereof, of the network node described above in connection with FIG. 2. In some aspects, the communication manager 140 includes a set of components, such as a beamforming component 808, or a combination thereof. Alternatively, the set of components may be separate and distinct from the communication manager 140. In some aspects, one or more components of the set of components may include or may be implemented within a controller/processor, a memory, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive an indication of a beam switching mode for reception of a communication spanning multiple slots. The reception component 802 may receive the communication in a first group of symbols of the multiple slots using a first beam in accordance with the beam switching mode. The reception component 802 may receive the communication in a second group of symbols of the multiple slots using a second beam in accordance with the beam switching mode.

The reception component 802 may receive a configuration of a number of allowed beam switches within the multiple slots.

The reception component 802 may receive a configuration indicating the first group of symbols and the second group of symbols.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
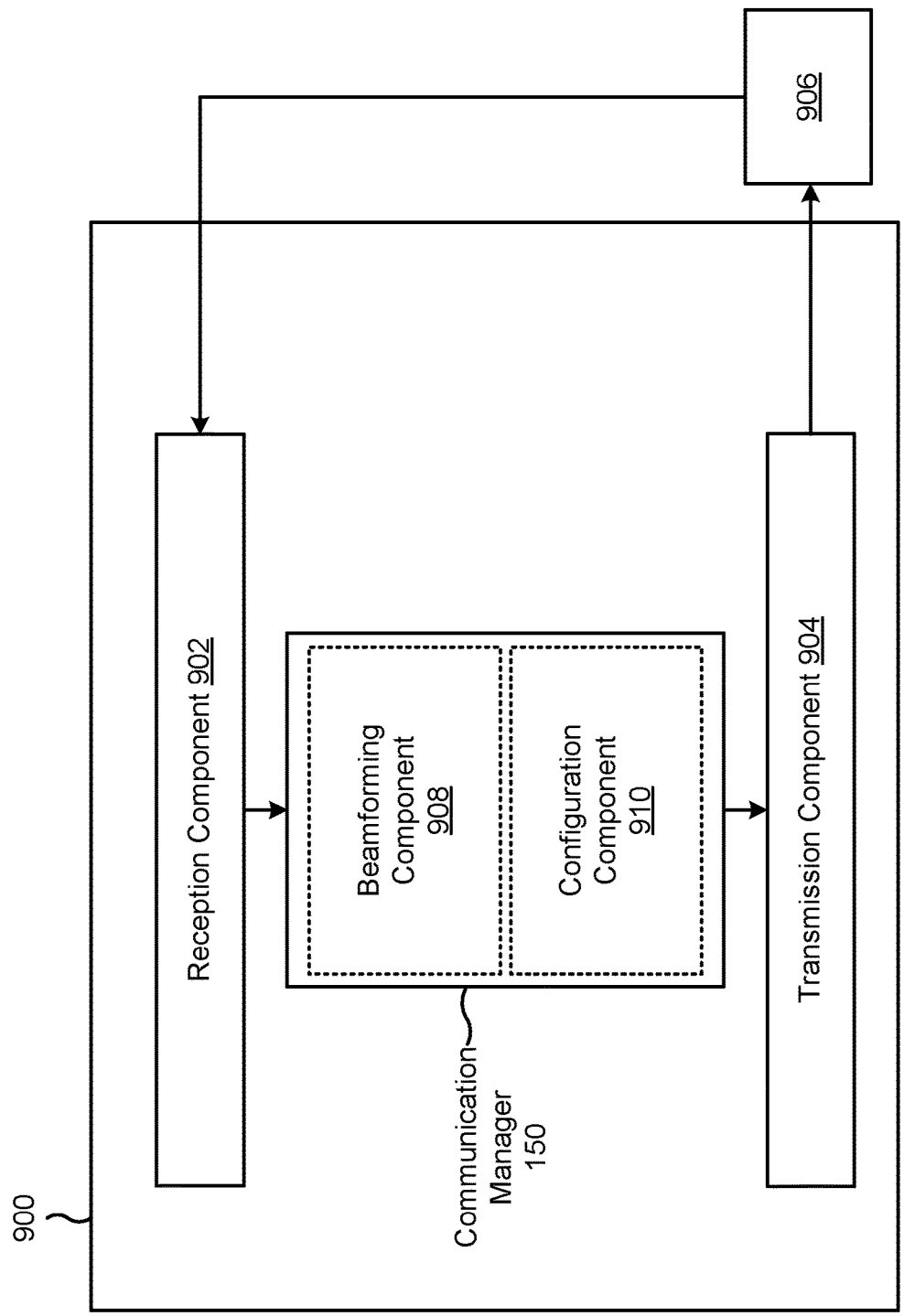
FIG. 9 is a diagram of an example apparatus for wireless communication in accordance with the present disclosure.

FIG. 9 is a diagram of an example apparatus 900 for wireless communication in accordance with the present disclosure. The apparatus 900 may be a network entity, or a network entity may include the apparatus 900. In some aspects, the apparatus 900 includes a reception component 902, a transmission component 904, and a communication manager 150, which may be in communication with one another (for example, via one or more buses). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 3-5. Additionally or alternatively, the apparatus 900 may be configured to perform one or more processes described herein, such as process 700 of FIG. 7, or a combination thereof. In some aspects, the apparatus 900 may include one or more components of the network entity described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the network entity described above in connection with FIG. 2.

The transmission component 904 may transmit communications, such as reference signals, control information, data communications, or a combination thereof, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described above in connection with FIG. 2. In some aspects, the transmission component 904 may be co-located with the reception component 902 in a transceiver.

The communication manager 150 may transmit or may cause the transmission component 904 to transmit an indication of a beam switching mode for reception of a communication spanning multiple slots. The communication manager 150 may transmit or may cause the beamforming component 908 to transmit or receive the communication in a first group of symbols of the multiple slots using a first beam in accordance with the beam switching mode. The communication manager 150 may transmit or may cause the beamforming component 908 to transmit or receive the communication in a second group of symbols of the multiple slots using a second beam in accordance with the beam switching mode. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network entity described above in connection with FIG. 2. In some aspects, the communication manager 150 includes a set of components, such as a beamforming component 908, a configuration component 910, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit an indication of a beam switching mode for reception of a communication spanning multiple slots. The beamforming component 908 may transmit the communication in a first group of symbols of the multiple slots using a first beam in accordance with the beam switching mode. The beamforming component 908 may transmit the communication in a second group of symbols of the multiple slots using a second beam in accordance with the beam switching mode.

The configuration component 910 may transmit a configuration of a number of allowed beam switches within the multiple slots.

The configuration component 910 may transmit a configuration indicating the first group of symbols and the second group of symbols.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a network node, comprising: receiving an indication of a beam switching mode for a communication spanning multiple slots; receiving or transmitting the communication in a first group of symbols of the multiple slots using a first beam in accordance with the beam switching mode; and receiving or transmitting the communication in a second group of symbols of the multiple slots using a second beam in accordance with the beam switching mode.

Aspect 2: The method of Aspect 1, wherein the indication is associated with a selection of a slot format indicator (SFI).

Aspect 3: The method of any of Aspects 1-2, wherein the indication is received via at least one of: capability information, downlink control information (DCI) signaling, medium access control-control element (MAC-CE) signaling, or radio resource control (RRC) signaling.

Aspect 4: The method of any of Aspects 1-3, further comprising receiving a configuration of a number of allowed beam switches within the multiple slots.

Aspect 5: The method of Aspect 4, wherein the number of allowed beam switches is based at least in part on a number of slots of the multiple slots.

Aspect 6: The method of Aspect 5, wherein the number of allowed beam switches is based at least in part on at least one of: an operating frequency, a diversity level possible with a channel associated with the communication, a beam switching latency, a hardware configuration, or a diversity requirement for a use case associated with the communication.

Aspect 7: The method of any of Aspects 1-6, further comprising receiving a configuration indicating the first group of symbols and the second group of symbols.

Aspect 8: The method of any of Aspects 1-7, wherein the first beam and the second beam are selected from a group of beams reported by the network node based at least in part on a metric associated with the first beam and the second beam.

Aspect 9: The method of Aspect 8, wherein the first beam and the second beam are selected based at least in part on at least one of: a power consumption, a thermal overhead, a signal strength improvement, or an ease of beam switching associated with a beam switching latency, a circuit-level transient, or a beam management capability.

Aspect 10: The method of any of Aspects 1-9, wherein the indication indicates an order, for the beam switching mode, associated with a group of beams including the first beam and the second beam.

Aspect 11: The method of any of Aspects 1-10, wherein receiving or transmitting the communication in the first group of symbols using the first beam further comprises detecting that the first beam is used in the first group of symbols.

Aspect 12: The method of Aspect 11, wherein the detection is performed at a symbol-level granularity.

Aspect 13: The method of Aspect 11, wherein the detection is based at least in part on a configuration indicating the first group of symbols.

Aspect 14: The method of Aspect 11, wherein the detection is performed using at least one of: a low-complexity receiver, a self-steering array, a secondary radio frequency chain, or sub-sampling of one or more symbols of the first group of symbols.

Aspect 15: The method of any of Aspects 1-14, wherein receiving the communication in the first group of symbols of the multiple slots using the first beam further comprises receiving the communication using at least one of: a frequency diversity mode, a time diversity mode, or a code diversity mode.

Aspect 16: A method of wireless communication performed by a network entity, comprising: transmitting an indication of a beam switching mode for reception or transmission of a communication spanning multiple slots; transmitting or receiving the communication in a first group of symbols of the multiple slots using a first beam in accordance with the beam switching mode; and transmitting or receiving the communication in a second group of symbols of the multiple slots using a second beam in accordance with the beam switching mode.

Aspect 17: The method of Aspect 16, wherein the indication is associated with a selection of a slot format indicator (SFI).

Aspect 18: The method of any of Aspects 16-17, wherein the indication is transmitted via at least one of: capability information, downlink control information (DCI) signaling, medium access control-control element (MAC-CE) signaling, or radio resource control (RRC) signaling.

Aspect 19: The method of any of Aspects 16-18, further comprising transmitting a configuration of a number of allowed beam switches within the multiple slots.

Aspect 20: The method of Aspect 19, wherein the number of allowed beam switches is based at least in part on a number of slots of the multiple slots.

Aspect 21: The method of Aspect 20, wherein the number of allowed beam switches is based at least in part on at least one of: an operating frequency, a diversity level possible with a channel associated with the communication, a beam switching latency, a hardware configuration, or a diversity requirement for a use case associated with the communication.

Aspect 22: The method of any of Aspects 16-21, further comprising transmitting a configuration indicating the first group of symbols and the second group of symbols.

Aspect 23: The method of any of Aspects 16-22, wherein the first beam and the second beam are selected from a reported group of beams based at least in part on a metric associated with the first beam and the second beam.

Aspect 24: The method of Aspect 23, wherein the first beam and the second beam are selected based at least in part on at least one of: a power consumption, a thermal overhead, a signal strength improvement, or an ease of beam switching associated with at least one of a beam switching latency, a circuit-level transient, or a beam management capability.

Aspect 25: The method of any of Aspects 16-24, wherein the indication indicates an order, for the beam switching mode, associated with a group of beams including the first beam and the second beam.

Aspect 26: The method of any of Aspects 16-25, wherein transmitting or receiving the communication in the first group of symbols of the multiple slots using the first beam further comprises transmitting or receiving the communication using at least one of: a frequency diversity mode, a time diversity mode, or a code diversity mode.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A network node for wireless communication, comprising:
   at least one memory; and
   at least one processor communicatively coupled with the at least one memory, the at least one processor configured to cause the network node to:
      receive an indication of a beam switching mode for a transport block spanning multiple slots;
      receive a configuration indicating a number of allowed beam switches within the multiple slots, wherein the number of allowed beam switches is greater than a number of slots of the multiple slots;
      receive or transmit the transport block in a first group of symbols of the multiple slots using a first beam in accordance with the beam switching mode and the configuration; and
      receive or transmit the transport block in a second group of symbols of the multiple slots using a second beam in accordance with the beam switching mode and the configuration.

2. The network node of claim 1, wherein the indication is associated with a selection of a slot format indicator (SFI).

3. The network node of claim 1, wherein the indication is received via at least one of:
   capability information,
   downlink control information (DCI) signaling,
   medium access control-control element (MAC-CE) signaling, or
   radio resource control (RRC) signaling.

4. The network node of claim 1, wherein the number of allowed beam switches is based at least in part on at least one of:
   an operating frequency,
   a diversity level possible with a channel associated with the transport block,
   a beam switching latency,
   a hardware configuration, or
   a diversity requirement for a use case associated with the transport block.

5. The network node of claim 1, wherein the at least one processor is further configured to cause the network node to receive a configuration indicating the first group of symbols and the second group of symbols.

6. The network node of claim 1, wherein the first beam and the second beam are selected from a group of beams reported by the network node based at least in part on a metric associated with the first beam and the second beam.

7. The network node of claim 6, wherein the first beam and the second beam are selected based at least in part on at least one of:
   a power consumption,
   a thermal overhead,
   a signal strength improvement, or
   an ease of beam switching associated with a beam switching latency, a circuit-level transient, or a beam management capability.

8. The network node of claim 1, wherein the indication indicates an order, for the beam switching mode, associated with a group of beams including the first beam and the second beam.

9. The network node of claim 1, wherein, to cause the network node to receive or transmit the transport block in the first group of symbols using the first beam, the at least one processor is configured to cause the network node to detect that the first beam is used in the first group of symbols.

10. The network node of claim 9, wherein the detection is performed at a symbol-level granularity.

11. The network node of claim 9, wherein the detection is based at least in part on a configuration indicating the first group of symbols.

12. The network node of claim 9, wherein the detection is performed using at least one of:
 a low-complexity receiver,
 a self-steering array,
 a secondary radio frequency chain, or
 sub-sampling of one or more symbols of the first group of symbols.

13. The network node of claim 1, wherein, to cause the network node to transmit or receive the transport block in the first group of symbols of the multiple slots using the first beam, the at least one processor is configured to cause the network node to transmit or receive the transport block using at least one of:
 a frequency diversity mode,
 a time diversity mode, or
 a code diversity mode.

14. The network node of claim 1, wherein the indication of the beam switching mode for the transport block spanning the multiple slots is received via a selection of a slot format indicator (SFI).

15. A network entity for wireless communication, comprising:
 at least one memory; and
 at least one processor communicatively coupled with the at least one memory, the at least one processor configured to cause the network entity to:
  transmit an indication of a beam switching mode for reception or transmission of a transport block spanning multiple slots;
  transmit a configuration indicating a number of allowed beam switches within the multiple slots, wherein the number of allowed beam switches is greater than a number of slots of the multiple slots;
  transmit or receive the transport block in a first group of symbols of the multiple slots using a first beam in accordance with the beam switching mode and the configuration; and
  transmit or receive the transport block in a second group of symbols of the multiple slots using a second beam in accordance with the beam switching mode and the configuration.

16. The network entity of claim 15, wherein the indication is associated with a selection of a slot format indicator (SFI).

17. The network entity of claim 15, wherein the indication is transmitted via at least one of:
 capability information,
 downlink control information (DCI) signaling,
 medium access control-control element (MAC-CE) signaling, or
 radio resource control (RRC) signaling.

18. The network entity of claim 15, wherein the number of allowed beam switches is based at least in part on at least one of:
 an operating frequency,
 a diversity level possible with a channel associated with the transport block,
 a beam switching latency,
 a hardware configuration, or
 a diversity requirement for a use case associated with the transport block.

19. The network entity of claim 15, wherein the at least one processor is further configured to cause the network entity to transmit a configuration indicating the first group of symbols and the second group of symbols.

20. The network entity of claim 15, wherein the first beam and the second beam are selected from a reported group of beams based at least in part on a metric associated with the first beam and the second beam.

21. The network entity of claim 20, wherein the first beam and the second beam are selected based at least in part on at least one of:
 a power consumption,
 a thermal overhead,
 a signal strength improvement, or
 an ease of beam switching associated with at least one of a beam switching latency, a circuit-level transient, or a beam management capability.

22. The network entity of claim 15, wherein the indication indicates an order, for the beam switching mode, associated with a group of beams including the first beam and the second beam.

23. The network entity of claim 15, wherein, to cause the network entity to transmit or receive the transport block in the first group of symbols of the multiple slots using the first beam, the at least one processor is configured to cause the network entity to transmit or receive the transport block using at least one of:
 a frequency diversity mode,
 a time diversity mode, or
 a code diversity mode.

24. The network entity of claim 15, wherein the indication of the beam switching mode for the transport block spanning the multiple slots is received via a selection of a slot format indicator (SFI).

25. A method of wireless communication performed by a network node, comprising:
 receiving an indication of a beam switching mode for a transport block spanning multiple slots;
 receiving a configuration indicating a number of allowed beam switches within the multiple slots, wherein the number of allowed beam switches is greater than a number of slots of the multiple slots;
 receiving or transmitting the transport block in a first group of symbols of the multiple slots using a first beam in accordance with the beam switching mode; and
 receiving or transmitting the transport block in a second group of symbols of the multiple slots using a second beam in accordance with the beam switching mode.

26. The method of claim 25, wherein the indication is associated with a selection of a slot format indicator (SFI).

27. A method of wireless communication performed by a network entity, comprising:
 transmitting an indication of a beam switching mode for reception or transmission of a transport block spanning multiple slots;
 transmitting a configuration indicating a number of allowed beam switches within the multiple slots, wherein the number of allowed beam switches is greater than a number of slots of the multiple slots;
 transmitting or receiving the transport block in a first group of symbols of the multiple slots using a first beam in accordance with the beam switching mode; and transmitting or receiving the transport block in a second group of symbols of the multiple slots using a second beam in accordance with the beam switching mode.

28. The method of claim 27, wherein the indication is associated with a selection of a slot format indicator (SFI).

* * * * *